United States Patent
Sasaki et al.

(10) Patent No.: US 9,920,836 B2
(45) Date of Patent: Mar. 20, 2018

(54) PISTON RING FOR INTERNAL COMBUSTION ENGINE

(71) Applicant: KABUSHIKI KAISHA RIKEN, Chiyoda-ku, Tokyo (JP)

(72) Inventors: Hayato Sasaki, Kumagaya (JP); Takashi Ono, Kumagaya (JP); Yongtie Yan, Kumagaya (JP)

(73) Assignee: KABUSHIKI KAISHA RIKEN, Chiyoda-ku, Tokyo (JP)

( * ) Notice: Subject to any disclaimer, the term of this patent is extended or adjusted under 35 U.S.C. 154(b) by 0 days.

(21) Appl. No.: 15/030,123

(22) PCT Filed: Oct. 16, 2014

(86) PCT No.: PCT/JP2014/005263
§ 371 (c)(1),
(2) Date: Apr. 18, 2016

(87) PCT Pub. No.: WO2015/056450
PCT Pub. Date: Apr. 23, 2015

(65) Prior Publication Data
US 2016/0265660 A1 Sep. 15, 2016
US 2017/0138476 A9 May 18, 2017

(30) Foreign Application Priority Data

Oct. 18, 2013 (JP) .................................. 2013-216984
Nov. 26, 2013 (JP) .................................. 2013-243996

(51) Int. Cl.
 *F16J 9/26* (2006.01)
 *F16J 9/22* (2006.01)
 *F16J 9/28* (2006.01)

(52) U.S. Cl.
 CPC . *F16J 9/22* (2013.01); *F16J 9/26* (2013.01); *F16J 9/28* (2013.01)

(58) Field of Classification Search
 CPC .................... F16J 9/22; F16J 9/26; F16J 9/28
 (Continued)

(56) References Cited

U.S. PATENT DOCUMENTS 3,081,196 A * 3/1963 MacDonald ............. C10M 7/00
 428/539.5
3,697,091 A * 10/1972 Prasse ........................ F16J 9/26
 277/442

(Continued)

FOREIGN PATENT DOCUMENTS

EP 0905420 A2 3/1999
JP H01-307568 A 12/1989
(Continued)

OTHER PUBLICATIONS

Ceramics—encyclopedia Britanica.*
(Continued)

*Primary Examiner* — Nathan Cumar
(74) *Attorney, Agent, or Firm* — Kenja IP Law PC (57) ABSTRACT

Provided is a piston ring for an internal combustion engine capable of preventing aluminum cohesion for a long time under conditions with high temperature and a high load and also suppressing the wearing of a piston member. A piston ring 1 for the internal combustion engine including a piston ring body 11 having at least one of an upper side face and a lower side face coated with an aluminum cohesion resistance film 12, wherein the aluminum cohesion resistance film 12 has a first coating film 12a made of first ceramics material formed on the piston ring body and a second coating film having Vickers hardness HV smaller than that of the first ceramics material formed on the first coating film 12a.

8 Claims, 2 Drawing Sheets

(58) Field of Classification Search
USPC ....... 277/310, 357, 434, 440, 442, 443, 444, 277/345, 592
See application file for complete search history.

(56) References Cited

U.S. PATENT DOCUMENTS

| | | | | |
|---|---|---|---|---|
| 5,297,365 | A | * 3/1994 | Nishioka | B24B 19/22 451/41 |
| 2008/0247687 | A1 | * 10/2008 | Stecher | B05D 5/08 384/7 |
| 2012/0242047 | A1 | * 9/2012 | Sasaki | F16J 9/26 277/443 |

FOREIGN PATENT DOCUMENTS

| | | |
|---|---|---|
| JP | H02-89876 A | 3/1990 |
| JP | H05172248 A | 7/1993 |
| JP | H07-63266 A | 3/1995 |
| JP | H11-92935 A | 4/1999 |
| JP | 2000-263688 A | 9/2000 |
| JP | 2003 014122 * | 1/2003 |
| JP | 2003-014122 A | 1/2003 |
| JP | 2007-278495 A | 10/2007 |
| JP | 2008-248986 A | 10/2008 |
| JP | 2009-235561 A | 10/2009 |
| WO | 2011/071049 A1 | 6/2011 |

OTHER PUBLICATIONS

Ceramics—chemisrty encyclopedia.*
Jan. 6, 2015, International Search Report issued in the International Patent Application No. PCT/JP2014/005263.
Nov. 30, 2016, Office Action issued by the State Intellectual Property Office in the corresponding Chinese Patent Application No. 201480057331.7.
Oct. 3, 2017, Notification of Reasons for Refusal issued by the Japan Patent Office in the corresponding Japanese Patent Application No. 2013-243996.

* cited by examiner

PISTON RING FOR INTERNAL COMBUSTION ENGINE

TECHNICAL FIELD

The present invention relates to a piston ring for an internal combustion engine and, in particular, to a piston ring for an internal combustion engine capable of preventing aluminum cohesion for a long time under a condition with high temperature and a high load and also reducing a wear amount of a piston member.

BACKGROUND

Three piston rings, a top ring, a second ring, and an oil ring that are used in an internal combustion engine, are disposed in such a manner that each of them engages with a ring groove provided on a surface of a piston and serve a gas sealing function of preventing a combustion gas leak from a combustion chamber, a heat conduction function of transmitting heat of the piston to a cylinder wall which is cooled down and thereby cooling the piston down, and a function of scooping out excess oil by applying an appropriate amount of engine oil serving as lubrication oil to the cylinder wall, respectively.

These three piston rings, during operation of the internal combustion engine when the piston is reciprocated by explosion of fuel in the combustion chamber, repeat colliding against a surface of the ring groove inside the ring groove of the piston. Also, since the piston ring is slidable in a circumferential direction thereof inside the ring groove, the piston ring slides inside the ring groove. However, on the surface of the ring groove, a projection of approximately 1 µm in height is formed by machine turning in formation of the ring groove. As the projection slides colliding against the piston ring, the projection becomes worn away, exposing an aluminum surface in the surface of the ring groove.

When the exposed aluminum surface further repeats sliding and colliding against a lateral surface of the piston ring, aluminum cohesion, a phenomenon in which aluminum alloy attaches to the lateral surface of the piston ring, occurs. This phenomenon is especially noticeable at the top ring located proximate to the combustion chamber and exposed to high temperature.

When the aluminum cohesion further progresses, the wearing of the ring groove rapidly progresses, enlarging a gap between the piston ring and the ring groove. As a result, the gas sealing function of the piston ring is degraded, causing a phenomenon what is called blowby in which high pressure combustion gas flows out to a crank chamber from the combustion chamber and leads to a reduction in engine power.

As such, there have been suggested a variety of techniques for preventing the aluminum cohesion of the piston ring. For example, PTL 1 describes a technique to provide a resin-based film containing carbon black particles to an upper side face and a lower side face of the piston ring that collide against and slide on the ring groove, thereby improving conformability and preventing the aluminum cohesion.

Also, PTL 2 describes a technique to provide a heat-resistant resin containing, relative to an entire coating film on the surface, 10 to 80 mass % of one or more powder selected from a group constituted by nickel-based powder, lead-based powder, zinc-based powder, tin-based powder, and silicon-based powder to at least one of the upper side face and the lower side face of the piston ring, thereby effectively preventing the aluminum cohesion to the piston ring.

However, the films described in PTLs 1 and 2 have a problem that, when temperature inside an engine rises, aluminum cohesion resistance is degraded. As such, PTL 3 describes a technique to provide a polyimide film containing hard particles and having a solid lubricant function to at least one of the upper side face and the lower side face of the piston ring, thereby maintaining high aluminum cohesion resistance for a long time under a condition with high temperature over 230° C.

Further, PTL 4 describes a technique to provide, in place of the resin-based film, a first diamond-like-carbon (DLC) coating film containing at least silicon and a second DLC coating film containing at least W, or W and Ni formed under the first DLC film, to the upper side face and the lower side face of the piston ring, thereby providing a piston ring having excellent aluminum cohesion resistance, scuff resistance, and abrasion resistance.

CITATION LIST

Patent Literature

PLT 1: JP-A-2007-278495
PLT 2: JP-A-2008-248986
PLT 3: WO2011/071049
PLT 4: JP-A-2003-014122

SUMMARY

Technical Problem

In recent years, incidentally, downsizing of engine has been progressing and an amount of exhaust gas has been reduced in order to improve fuel efficiency. As a result, temperature and pressure inside the engine have been increasingly rising. However, the resin-based film as described in PTL 3, under conditions with high temperature over 260° C. and a high load of an internal pressure of the engine in excess of 10 MPa, has difficulty in maintaining aluminum cohesion resistance performance for a long time. Also, the DLC coating film described in PTL 4, due to the graphitization of diamond under the conditions with high temperature over 260° C., has difficulty in exerting inherent characteristics thereof and maintaining aluminum cohesion resistance.

Further, in addition to long-term prevention of the aluminum cohesion under such conditions with high temperature and a high load, it is of importance to reduce a wear amount of a piston member on the surface of the ring groove by reducing the collision of the piston ring against the surface of the ring groove.

Therefore, it could be helpful to provide a piston ring for an internal combustion engine capable of preventing the aluminum cohesion for a long time under the condition with high temperature and a high load and also reducing the wear amount of the piston member.

Solution to Problem

As a result of our diligent search for a method to solve the above problems, the inventors have found that it is very effective to provide an aluminum cohesion resistance film having a two-layer structure having a first coating film made of first ceramics material formed on a piston ring body and a second coating film having Vickers hardness HV smaller than that of the first ceramics material formed on the first coating film, and thus accomplished the disclosure herein.

That is, a summary of the disclosure herein is as follows:

(1) A piston ring for an internal combustion engine including a piston ring body having at least one of an upper side face and a lower side face coated with an aluminum cohesion resistance film, wherein the aluminum cohesion resistance film has a first coating film made of first ceramics material formed on the piston ring body and a second coating film having Vickers hardness HV smaller than that of the first ceramics material formed on the first coating film.

(2) The piston ring for the internal combustion engine according to the above (1), wherein the second coating film is made of second ceramics material, and the Vickers hardness HV of the first coating film and that of the second coating film are 1000 to 2800 and 500 to 800, respectively.

(3) The piston ring for the internal combustion engine according to the above (1), wherein the second coating film is made of resin or metal, and the Vickers hardness HV of the first coating film and that of the second coating film are 500 to 2800 and 20 to 300, respectively.

(4) The piston ring for the internal combustion engine according to any one of the above (1) to (3), wherein the Vickers hardness HV of the first coating film and an arithmetic mean roughness Ra (μm) of a surface of the first coating film satisfy the following formula (A):

$$Ra < -8.7 \times 10^{-5} HV + 0.39 \quad (A)$$

(5) The piston ring for the internal combustion engine according to any one of the above (1) to (4), wherein the Vickers hardness HV of the first coating film and a thickness h (μm) of the first coating film satisfy the following formula (B):

$$h > -2.9 \times 10^{-4} HV + 0.89 \quad (B)$$

(6) The piston ring for the internal combustion engine according to any one of the above (1) to (5), wherein the arithmetic mean roughness of the surface of the first coating film is 0.3 μm or less.

(7) The piston ring for the internal combustion engine according to any one of the above (1) to (6), wherein the thickness of the first coating film is 0.1 μm or more, a thickness of the second coating film is 1 μm or more, and a total thickness of the first coating film and the second coating film is 20 μm or less.

(8) The piston ring for the internal combustion engine according to any one of the above (1), (2), and (4) to (7), wherein the first ceramics material is at least one selected from a group consisting of alumina, zirconia, chromia, silica, silicon carbide, chromium carbide, titanium nitride, chromium nitride, silicon nitride, and aluminum nitride, and the second ceramics is at least one selected from a group consisting of titania, yttria, and magnesia.

(9) The piston ring for the internal combustion engine according to any one of the above (1) and (3) to (7), wherein the first ceramics material is at least one of alumina, titania, yttria, zirconia, silica, magnesia, chromia, silicon carbide, chromium carbide, aluminum nitride, titanium nitride, silicon nitride, and chromium nitride; material of the resin is at least one of polyimide, polyetherimide, polyamideimide, polysulfone, polyether sulfone, polyarylate, polyphenylene sulfide, polyether ether ketone, aromatic polyester, aromatic polyamide, polybenzimidazole, polybenzoxazole, aromatic polycyanurate, aromatic polythiocyanurate, and aromatic polyguanamin; and material of the metal is at least one of indium, lead, tin, copper, silver, and gold.

Advantageous Effect

According to the disclosure herein, since the aluminum cohesion resistance film has the two-layer structure having the second coating film with a relatively small Vickers hardness HV for forming a conformable surface and the first coating film with a relatively large Vickers hardness HV for imparting durability to the aluminum cohesion resistance film, the aluminum cohesion may be prevented for a long time under conditions with high temperature and a high load, and a wear amount of a piston member may be reduced.

DETAILED DESCRIPTION

Figure 1:
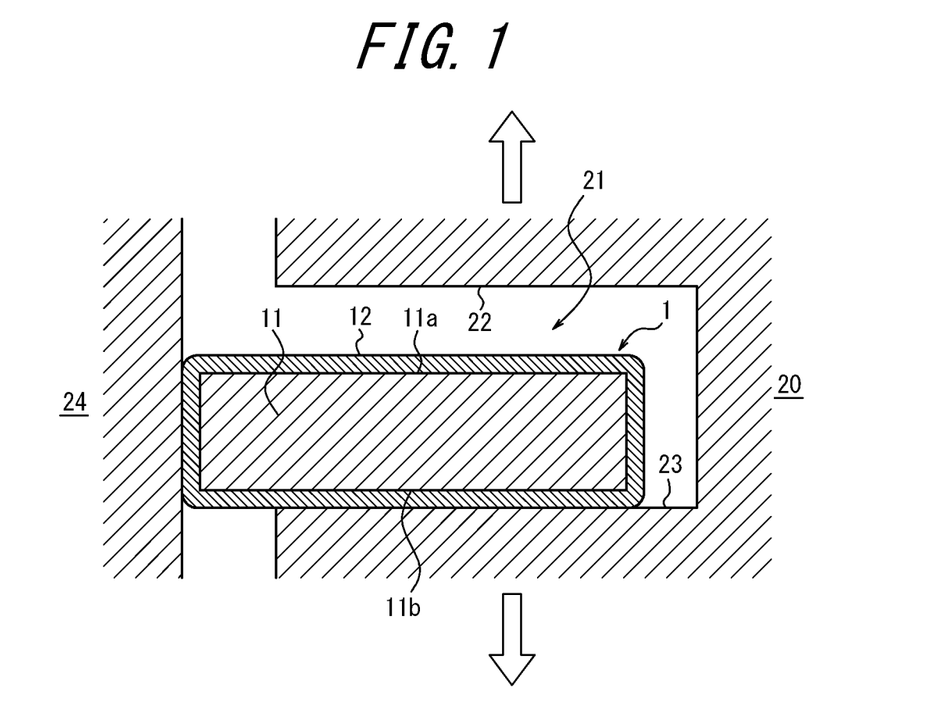
FIG. 1 is a schematic cross-sectional view of a piston ring for an internal combustion engine of the disclosure herein in a state engaging with a ring groove.
Figure 2:
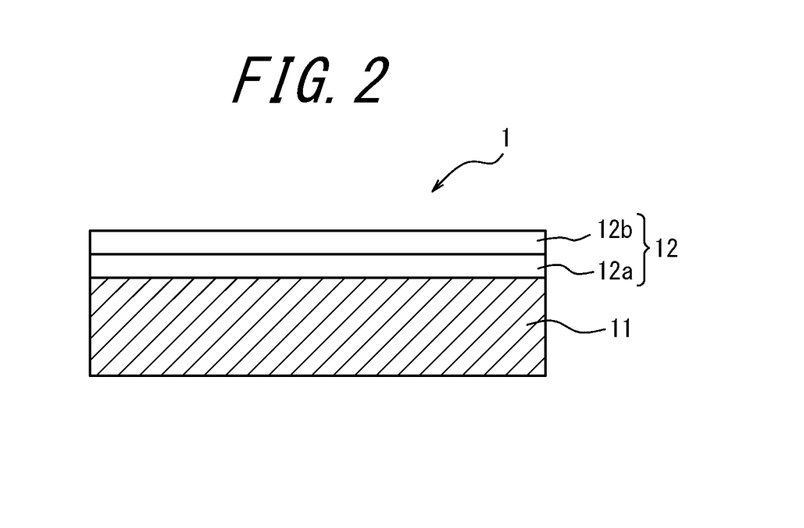
FIG. 2 is an enlarged view of a portion of an aluminum cohesion resistance film of the piston ring for the internal combustion engine of the disclosure herein.

Hereinafter, an embodiment of the disclosure herein will be described with reference to the accompanying drawings. FIG. 1 is a schematic cross-sectional view of a piston ring for an internal combustion engine according to the disclosure herein in a state engaging with a ring groove. A piston ring 1 for the internal combustion engine in this figure is a piston ring including a piston ring body 11 for the internal combustion engine coated with an aluminum cohesion resistance film 12. Here, it is essential that the aluminum cohesion resistance film 12, as illustrated in FIG. 2, has a first coating 12a made of first ceramics material formed on the piston ring body 11 and a second coating film 12b having Vickers hardness HV smaller than that of the first ceramics material formed on the first coating film 12a.

As illustrated in FIG. 1, the piston ring 1 engages with a ring groove 21 inside thereof and closes a gap between a side wall of a cylinder 24 and a piston 20, thereby sealing combustion gas and oil in. The piston ring 1, following a reciprocating motion of the piston 20 (a motion indicated by arrows in the figure), moves upward and downward inside the ring groove 21 and repetitively collides against an upper face 22 and a lower face 23 of the ring groove 21. Also, since the piston ring 1 is slidable in a circumferential direction inside the ring groove 21, the piston ring 1 repeatedly slides colliding against the upper face 22 and the lower face 23 of the ring groove 21.

Since the piston ring 1 repeatedly slides and collides against the upper face 22 and the lower face 23 of the ring groove 21, projections (not shown) formed on the upper face 22 and the lower face 23 of the ring groove 21 are scraped off, exposing an aluminum surface around projection marks. According to the disclosure herein, the second coating film 12b with a relatively low Vickers hardness HV (i.e., soft) collides against the upper face 22 and the lower face 23 of the ring groove 21, thereby effectively forming a conformable surface where the aluminum surface is scraped off and primary crystal silicon is exposed on the surface. Also, the first coating film 12a with a relatively large Vickers hardness HV (i.e., hard) has high durability under conditions with high temperature and a high load and may prevent aluminum cohesion for a long time. The following is a description a structure of the piston ring 1 for the internal combustion engine.

Material of the piston ring body 11 is not particularly limited as long as it has the strength to withstand an impact with the ring groove 21. However, the material is preferably steel, martensitic stainless steel, austenitic stainless steel, high-grade cast iron, or the like. Also, in order to improve wear resistance, the surface of the piston ring body 11 preferably has been undergone nitriding treatment when the piston ring body 11 is made of stainless steel, or hard Cr plating or electroless nickel plating when the piston ring body 11 is made of cast iron.

According to the disclosure herein, the second coating film is made of ceramics (second ceramics) material, resin, or metal. Here, since requirements for the first coating film depends on the material of the second coating film, the following is a detailed description of each material of the second coating film.

<Second Coating Film Made of Ceramics (Second Ceramics)>

First, when the second coating film is made of ceramics (the second ceramics) material, the Vickers hardness HV of the first coating film 12a is preferably 1000 to 2800. Here, when the first coating film 12a has the Vickers hardness HV of 1000 or more, the aluminum cohesion resistance film 12 may secure a sufficient hardness and prevent itself from being significantly worn out by the primary crystal silicon (with the Vickers hardness HV of approximately 1000) in a surface layer of the conformable surface formed in the surface of the ring groove 21. Also, when the first coating film 12a has the Vickers hardness HV of 2800 or less, a ratio to destroy the primary crystal silicon in the surface layer of the conformable surface may be reduced, and the piston member on the surface of the ring groove may be prevented from being significantly worn out.

Also, the Vickers hardness HV of the second coating film 12b is preferably 500 to 800. Here, when the Vickers hardness HV is 500 or more, a protrusion tip on the surface of the ring groove may be worn out. Also, when the Vickers hardness HV is 800 or less, a flat portion on the surface of the ring groove is hardly worn out. That is, when the Vickers hardness HV is 500 to 800, the protrusion portion alone on the surface of the ring groove may be selectively worn out and flattened.

The first ceramics material forming the first coating film 12a may be at least one selected from a group consisting of alumina, zirconia, chromia, silica, silicon carbide, chromium carbide, titanium nitride, chromium nitride, silicon nitride, and aluminum nitride. Of these, from a viewpoint of high reconnectivity between particles and easy formation of an even coating film, alumina, zirconia, chromia, and silica are particularly preferred.

Also, the second ceramics forming the second coating film 12b may be at least one selected from a group consisting of titania, yttria, and magnesia. Of these, titania and magnesia are particularly preferred, because uniform powder materials thereof are readily available.

<Second Coating Film Made of Resin or Metal>

Next, when the second coating film is made of resin or metal, the Vickers hardness HV of the first coating film 12a is preferably 500 to 2800. Here, when the first coating film 12a has the Vickers hardness HV of 500 or more, the aluminum cohesion resistance film 12 may secure a sufficient hardness and prevent itself from being significantly worn out by the primary crystal silicon (with the Vickers hardness HV of approximately 1000) in the surface layer of the conformable surface formed in the surface of the ring groove 21. Also, when the first coating film 12a has the Vickers hardness HV of 2800 or less, the ratio to destroy the primary crystal silicon in the surface layer of the conformable surface may be reduced, and the piston member may be prevented from being significantly worn out.

Also, the Vickers hardness HV of the second coating film 12b is preferably 20 to 300. Here, when the Vickers hardness HV is 20 or more, the protrusion tip on the surface of the piston member may be worn out. Also, when the Vickers hardness HV is 300 or less, the flat portion on the surface of the ring groove is hardly worn out. That is, when the Vickers hardness HV is 20 to 300, the protrusion portion alone on the surface of the ring groove may be selectively worn out and flattened.

The first ceramics forming the first coating film 12a may be at least one selected from a group consisting of alumina, titania, yttria, zirconia, silica, magnesia, chromia, silicon carbide, chromium carbide, aluminum nitride, titanium nitride, silicon nitride, and chromium nitride. Of these, from a viewpoint of high reconnectivity between particles and easy formation of an even coating film, alumina, zirconia, chromia, and silica are particularly preferred.

Also, when the second coating film 12b is made of resin, material of the resin may be at least one selected from polyimide (Polyimide, PI), polyetherimide, polyamide-imide (Polyamideimide, PAI), polysulfone, polyether sulfone (Polyethersulfone, PES), polyarylate (Polyarylate, PAR), polyphenylene sulfide (polyphenylenesulfide, PPS), polyether ether ketone (polyetheretherketone, PEEK), aromatic polyester, aromatic polyamide, polybenzimidazole (polybenzimidazole, PBI), polybenzoxazole, aromatic polycyanurates, aromatic polythiocyanurate, and aromatic poriguanamin. Of these, polyimide, polyamide-imide, and polybenzimidazole are particularly preferred, because they are thermosetting resins having a high rigidity and a low frictionality and do not exhibit thermoplasticity.

Further, the second coating film 12b made of the resin preferably contains hard particles. Thereby, the second coating film 12b has a low friction coefficient, a high rigidity, and an improved polishing capability and wear resistance. Material of the hard particles may be at least one of alumina, zirconia, ceria, silicon carbide, silicon nitride, cubic boron nitride, and diamond. Of these, from a viewpoint of popularity and inexpensiveness, alumina, zirconia, and ceria are preferable.

The hard particles have particle diameters of 0.05 μm to 3 μm. Here, the reason to have particle diameters of at least 0.05 μm is to obtain effective grinding capabilities in order to form the conformable surface quickly. Further, the reason to have particle diameters of 3 μm or less is to prevent from colliding against the ring groove 21 more than necessary in the formation of the conformable surface. Preferably, the particle diameters are 0.1 μm to 1 μm.

Further, an addition amount of the hard particles is 1% by volume to 20% by volume relative to the entire volume of the second coating film 12b. Here, the reason to have the addition amount of at least 1% by volume is to obtain effective grinding capabilities in order to form the conformable surface quickly. Further, the reason to have the addition amount of 20% by volume or less is to prevent from colliding against the ring groove 21 more than necessary in the formation of the conformable surface. Preferably, the addition amount is 3% by volume to 10% by volume.

When the second coating film 12b is made of metal, material of the metal may be at least one of indium, lead, tin, copper, silver, and gold. Of these, tin is particularly preferred from a viewpoint of a congeniality to the piston member and availability at low cost.

The following conditions are required regardless of the material of the second coating film. Surface roughness of the first coating film 12a is preferably no more than 0.3 µm. The first coating film 12a made of the first ceramics having such surface roughness, when coming into contact with the ring groove 21, may suppress an increase in a surface pressure that is locally generated and reduce the collision against the surface of the ring groove 21, thereby suppressing an increase in a wear amount of the piston member. Note that, in the disclosure herein, the surface roughness of the ceramics is represented by an arithmetic mean roughness Ra in conformity with JIS B0601(1994) and measured by means of a surface roughness measurement apparatus. Further, the surface roughness of the first coating film 12a is more preferably 0.03 to 0.1 µm. When the first coating film 12a has the surface roughness within this range, the adhesion to the second membrane 12b is improved, and a lamination structure formed by the first coating film 12a and the second coating film 12b may be maintained for a longer period of time.

Note that, although the second coating film 12b is formed on the first coating film 12a and thus the first coating film 12a has no surface, "the surface roughness of the first coating film 12a" means surface roughness thereof before the second coating film 12b is formed thereon.

Further, the surface of the second coating film 12b, when the film thickness is up to approximately 3 µm, maintains a contour of the surface of the first coating film 12a and preferably has the surface roughness of 0.5 µm or less. Thereby, the second coating film 12b may prevent from being worn out at the time of the formation of the conformable surface.

Here, the Vickers hardness HV of the first coating film 12a and the arithmetic mean roughness Ra (µm) of the surface of the first coating film 12a preferably satisfy the following formula (A):

$$Ra < -8.7 \times 10^{-5} HV + 0.39 \qquad (A)$$

We formed the aluminum cohesion resistance film 12 made of various materials and having various Vickers hardness HV, surface roughness, and film thicknesses on the piston ring body 11 and evaluated aluminum cohesion resistance performance of the piston ring 1 thus obtained and the wear amount of the piston member. As a result, we have found that the first coating film 12a having the Vickers hardness HV and the arithmetic mean roughness Ra (µm) of the surface satisfying the above formula (A) is capable of suppressing the wearing of the piston member and has high aluminum cohesion resistance performance. This may be because, when the arithmetic mean roughness Ra of the surface at an appropriate value corresponding to the Vickers hardness HV of the first coating film 12a, at the time of the contact between the piston ring 1 and the upper face 22 and the lower face 23 of the ring groove 21, a localized increase in a surface pressure generated therebetween may be suppressed.

Further, a thickness of the first coating film 12a is preferably 0.1 µm or more. Thereby, the thickness of the coating film becomes even and sufficient relative to the surface roughness of the first ceramics and may reduce the wear amount. Also, a thickness of the second coating film 12b is preferably at least (surface roughness of the first coating film 12a+1 µm). Thereby, the second coating film 12b alone allows the formation of the conformable surface.

Further, a total thickness of the first coating film 12a and the second coating film 12b is 20 µm or less. Thereby, a sufficient clearance may be secured inside the ring groove 21, allowing execution of the above function of the piston ring 1.

Here, the Vickers hardness HV and a film thickness h (µm) of the first coating film 12a preferably satisfy the following formula (B):

$$h > -2.9 \times 10^{-4} HV + 0.89 \qquad (B)$$

We have found that, similarly to the above formula (A), when the first coating film 12a having the Vickers hardness HV and the film thickness that satisfy the above formula (B) is capable of suppressing the wearing of the piston member and has high aluminum cohesion resistance performance. This may be because, when the film thickness h is at an appropriate value corresponding to the hardness of the first membrane 12a, the first coating film 12a does not become worn out, and the wearing of the piston member may be suppressed.

The aluminum cohesion resistance film 12 may be formed by a variety of known methods. In particular, using thermal spraying, chemical vapor deposition (CVD), physical vapor deposition (PVD), a variety of known methods to laminate ceramics fine particles or vaporized ceramics fine particles directly onto the surface, a cold spray method, a sol-gel method or the like under appropriate film formation conditions allows production of the piston ring of the disclosure herein.

Note that, although in the above embodiment the aluminum cohesion resistance film 12 has a two-layer structure, the aluminum cohesion resistance film 12 may have three or more layers. For example, when the aluminum cohesion resistance film 12 has three layers, the first coating film formed on the piston ring body is the hardest, and the second coating film formed on the first coating film is the second hardest, and the third coating film is the third hardest; that is, the coating film more closer to the surface has smaller hardness. However, when the second coating film is provided for the purpose of improving the adhesiveness between the first coating film and the third coating film, the hardness of the second coating film does not need to conform to the above guideline.

As for the surface roughness of the coating films, also, the first coating film and the third coating film preferably have the surface roughness of 0.3 µm or less and 0.5 µm or less, respectively. Although the surface roughness of the second coating film is not particularly limited, the second coating film preferably has appropriate surface roughness that allows the surface roughness of the third coating film to fall within the above range.

Also, the film thickness of the first coating film alone is preferably 0.1 µm or more, and the film thickness of the second coating film is preferably 1 µm or more. Further, the film thickness of the third coating film is preferably (the surface roughness of the second coating film+at least 1 µm). A total thickness of these films is preferably 20 µm or less.

Also, although the materials of the second coating film and the third coating film may be either the same or different, an outermost coating film (i.e., the third coating film) is made of the resin or the metal mentioned herein.

Further, when the second coating film serves as an intermediate layer for adhering the first coating film and the third coating film together, the second coating film is a composite coating film of the first coating film and the third coating film.

Note that the above guideline is applicable also to the aluminum cohesion resistance film 12 having four or more layers.

Accordingly, the piston ring of the disclosure herein, under conditions with high temperature and a high load, is capable of preventing the aluminum cohesion for a long time and also reducing the wear amount of the piston member.

EXAMPLES

Example 1

<Production of Piston Ring>

The following is a description of examples of the disclosure herein.

On the upper side face and the lower side face of the piston ring body made of low chromium steel, coating films made of materials and having the Vickers hardness, the surface roughness, and the film thickness as shown in Tables 1 to 3 were formed. Here, films made of $Al_2O_3$, $ZrO_2$, $Y_2O_3$, or $TiO_2$ were formed by a known method of laminating the ceramics fine particles or the vaporized ceramics fine particles directly on the surface, and films made of $Cr_2O_3$, MgO, $3Al_2O_3$-$2SiO_2$, $2MgO$—$SiO_2$, $Al_2O_3$-40% $TiO_2$ were formed by the spraying. Also, films made of SiC, $Si_3N_4$, $SiO_2$, or AlN were made by the CVD, and films made of TiN, CrN, or CrC were made by the PDV. Accordingly, in Example 1, for example, the first coating film made of SiC was formed by the CVD, while the second coating film made of $TiO_2$ was formed by the known method of laminating the ceramics fine particles or the vaporized ceramics fine particles directly on the surface.

On the other hand, in Comparative Examples 1 and 2, the coating film was formed by the spraying using a coating material adjusted to have compositions as described below, and the piston ring was thus produced.

In Comparative Example 3, the coating film was formed by electroless plating, and the piston ring was thus produced.

In Comparative Example 4, the coating film was formed by the PVD, and the piston ring was thus produced.

In Comparative Example 5, further, the coating film was formed by the known method of laminating the ceramic fine particles or the vaporized ceramics fine particles directly on the surface, and the piston ring was thus produced.

Note that, in Examples 13 to 16 in Table 1, at least one of the first coating film and the second coating film was made of two kinds of ceramics, and the first coating film of the Example 13 was made by mixing $Al_2O_3$ and $SiO_2$ at a ratio of 3:2. Also, a second coating film of Example 14 was made by mixing MgO and $SiO_2$ at a ratio of 2:1, and the second coating film of Example 15 was made by adding 40% by mass of $TiO_2$ to $Al_2O_3$. In Example 16, the first coating film was made by mixing $Al_2O_3$ and $SiO_2$ at the ratio of 3:2, and the second coating film was made by adding 40% by mass of $TiO_2$ to $Al_2O_3$.

Also, a resin coating film A of Comparative Example 1 is a polyimide resin coating film containing 5% by mass of $MoS_2$ powder (mean particle size: 2 μm) and 5% by mass of graphite powder (mean particle size: 2 μm).

Also, a resin coating film B of Comparative Example 2 is a polyimide resin coating film containing 10% by mass of $Al_2O_3$ powder (mean particle size: 0.5 μm).

Further, an aluminum cohesion resistance film of Comparative Example 5 is made of $Al_2O_3$ and has a single-layer structure.

TABLE 1

| | Coating film | | | | | | | | Results of engine simulation test | | | |
|---|---|---|---|---|---|---|---|---|---|---|---|---|
| | Material | | Vickers hardness (HV) | | Surface roughness Ra (μm) | | Film thickness (μm) | | | Piston ring | | |
| | First coating film | Second coating film | First coating film | Second coating film | First coating film | Second coating film | First coating film | Second coating film | Amount of remaining coating film | Aluminum cohesion resistance performance | Piston member Wear amount | Evaluation |
| Example 1 | SiC | $TiO_2$ | 2800 | 500 | 0.05 | | 1 | 1 | Excellent | Excellent | Excellent | Excellent |
| Example 2 | TiN | $TiO_2$ | 2200 | 500 | 0.05 | | 1 | 1 | Excellent | Excellent | Excellent | Excellent |
| Example 3 | CrN | $TiO_2$ | 2000 | 500 | 0.05 | | 1 | 1 | Excellent | Excellent | Excellent | Excellent |
| Example 4 | $Al_2O_3$ | $TiO_2$ | 1700 | 500 | 0.05 | | 1 | 1 | Excellent | Excellent | Excellent | Excellent |
| Example 5 | CrC | $TiO_2$ | 1600 | 500 | 0.05 | | 1 | 1 | Excellent | Excellent | Excellent | Excellent |
| Example 6 | $Si_3N_4$ | $TiO_2$ | 1500 | 500 | 0.05 | | 1 | 1 | Excellent | Excellent | Excellent | Excellent |
| Example 7 | $ZrO_2$ | $TiO_2$ | 1400 | 500 | 0.05 | | 1 | 1 | Excellent | Excellent | Excellent | Excellent |
| Example 8 | $Cr_2O_3$ | $TiO_2$ | 1300 | 500 | 0.05 | | 1 | 1 | Excellent | Excellent | Excellent | Excellent |
| Example 9 | $SiO_2$ | $TiO_2$ | 1000 | 500 | 0.05 | | 1 | 1 | Good | Excellent | Excellent | Excellent |
| Example 10 | AlN | $TiO_2$ | 1000 | 500 | 0.05 | | 1 | 1 | Good | Excellent | Excellent | Excellent |
| Example 11 | $Al_2O_3$ | $Y_2O_3$ | 1700 | 700 | 0.05 | | 1 | 1 | Excellent | Excellent | Excellent | Excellent |
| Example 12 | $Al_2O_3$ | MgO | 1700 | 700 | 0.05 | | 1 | 1 | Excellent | Excellent | Excellent | Excellent |
| Example 13 | $3Al_2O_3$—$2SiO_2$ | $TiO_2$ | 1200 | 500 | 0.05 | | 1 | 1 | Excellent | Excellent | Excellent | Excellent |
| Example 14 | $Al_2O_3$ | $2MgO$—$SiO_2$ | 1700 | 800 | 0.05 | | 1 | 1 | Excellent | Excellent | Excellent | Excellent |
| Example 15 | $Al_2O_3$ | $Al_2O_3$—40%$TiO_2$ | 1700 | 700 | 0.05 | | 1 | 1 | Excellent | Excellent | Excellent | Excellent |
| Example 16 | $3Al_2O_3$—$2SiO_2$ | $Al_2O_3$—40%$TiO_2$ | 1200 | 700 | 0.05 | | 1 | 1 | Excellent | Excellent | Excellent | Excellent |
| Comparative Example 1 | Resin coating film A | | 25 | | 0.1 | | 20 | | Poor | Poor | Poor | Poor |
| Comparative Example 2 | Resin coating film B | | 40 | | 0.1 | | 20 | | Poor | Poor | Poor | Poor |
| Comparative Example 3 | Ni | | 300 | | 0.05 | | 20 | | Poor | Good | Fair | Fair |
| Comparative Example 4 | DLC | | 5000 | | 0.01 | | 1 | | Excellent | Excellent | Poor | Fair |

TABLE 1-continued

| | Material | | Vickers hardness (HV) | | Surface roughness Ra (μm) | | Film thickness (μm) | | Results of engine simulation test | | | |
|---|---|---|---|---|---|---|---|---|---|---|---|---|
| | | | | | | | | | Amount of remaining coating film | Aluminum cohesion resistance performance | Piston ring Piston member Wear amount | Evaluation |
| | First coating film | Second coating film | First coating film | Second coating film | First coating film | First coating film | Second coating film | | | | | |
| Comparative Example 5 | Al₂O₃ | | 1700 | | 0.05 | 1 | | | Excellent | Excellent | Good | Good |

TABLE 2

| | Material | | Vickers hardness (HV) | | Surface roughness Ra (μm) | Film thickness (μm) | | Results of engine simulation test | | | |
|---|---|---|---|---|---|---|---|---|---|---|---|
| | First coating film | Second coating film | First coating film | Second coating film | First coating film | First coating film | Second coating film | Amount of remaining coating film | Aluminum cohesion resistance performance | Piston member Wear amount | Evaluation |
| Example 17 | SiC | TiO₂ | 2800 | 500 | 0.05 | 0.05 | 1 | Poor | Good | Good | Good |
| Example 18 | SiC | TiO₂ | 2800 | 500 | 0.05 | 0.1 | 1 | Fair | Excellent | Excellent | Excellent |
| Example 19 | SiC | TiO₂ | 2800 | 500 | 0.05 | 0.5 | 1 | Good | Excellent | Excellent | Excellent |
| Example 20 | SiC | TiO₂ | 2800 | 500 | 0.05 | 1 | 1 | Excellent | Excellent | Excellent | Excellent |
| Example 21 | SiC | TiO₂ | 2800 | 500 | 0.05 | 3 | 1 | Excellent | Excellent | Excellent | Excellent |
| Example 22 | SiO₂ | TiO₂ | 1000 | 500 | 0.05 | 0.5 | 1 | Poor | Good | Good | Good |
| Example 23 | SiO₂ | TiO₂ | 1000 | 500 | 0.05 | 1 | 1 | Good | Excellent | Excellent | Excellent |
| Example 24 | SiO₂ | TiO₂ | 1000 | 500 | 0.05 | 2 | 1 | Excellent | Excellent | Excellent | Excellent |
| Example 25 | SiO₂ | TiO₂ | 1000 | 500 | 0.05 | 5 | 1 | Excellent | Excellent | Excellent | Excellent |
| Example 26 | SiO₂ | TiO₂ | 1000 | 500 | 0.05 | 10 | 1 | Excellent | Excellent | Excellent | Excellent |
| Example 27 | SiO₂ | TiO₂ | 1000 | 500 | 0.05 | 1 | 0.5 | Good | Excellent | Good | Good |
| Example 28 | SiO₂ | TiO₂ | 1000 | 500 | 0.05 | 1 | 2 | Good | Excellent | Excellent | Excellent |

TABLE 3

| | Material | | Vickers hardness (HV) | | Surface roughness Ra (μm) | Film thickness (μm) | | Results of engine simulation test | | | |
|---|---|---|---|---|---|---|---|---|---|---|---|
| | First coating film | Second coating film | First coating film | Second coating film | First coating film | First coating film | Second coating film | Amount of remaining coating film | Aluminum cohesion resistance performance | Piston member Wear amount | Evaluation |
| Example 29 | SiC | TiO₂ | 2800 | 500 | 0.01 | 1 | 1 | Excellent | Excellent | Excellent | Excellent |
| Example 30 | SiC | TiO₂ | 2800 | 500 | 0.1 | 1 | 1 | Excellent | Excellent | Excellent | Excellent |
| Example 31 | SiC | TiO₂ | 2800 | 500 | 0.2 | 1 | 1 | Excellent | Excellent | Fair | Good |
| Example 32 | SiO₂ | TiO₂ | 1000 | 500 | 0.2 | 1 | 1 | Good | Excellent | Excellent | Excellent |
| Example 33 | SiO₂ | TiO₂ | 1000 | 500 | 0.3 | 1 | 1 | Good | Excellent | Excellent | Excellent |
| Example 34 | SiO₂ | TiO₂ | 1000 | 500 | 0.4 | 1 | 1 | Good | Excellent | Fair | Good |

Figure 3:
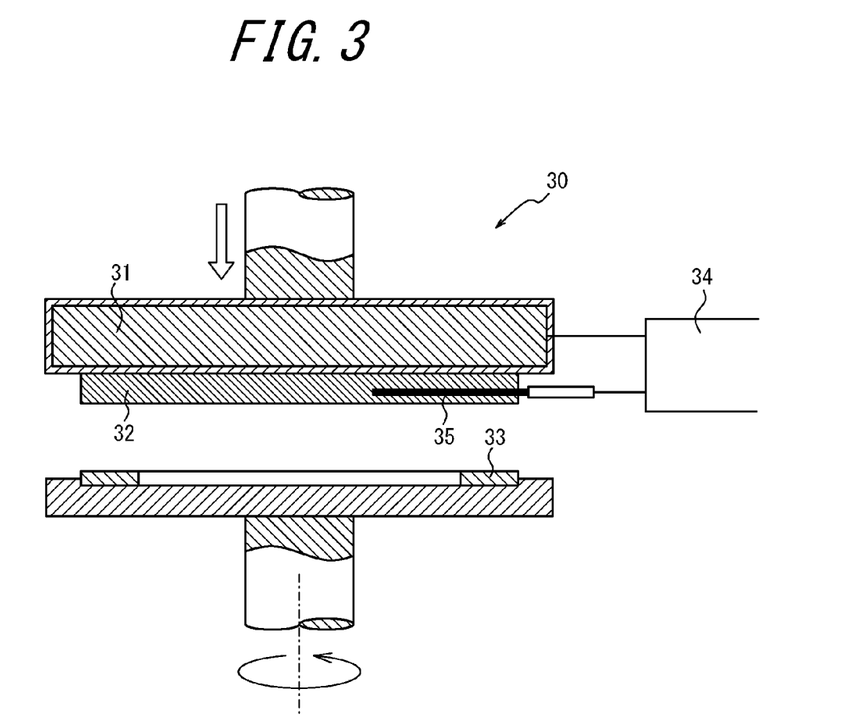
FIG. 3 is a schematic view of an engine simulation testing apparatus used in the examples.

The aluminum cohesion resistance performance of the piston rings of Examples 1 to 34 and Comparative Examples 1 to 5 was evaluated by using an engine simulation testing apparatus illustrated in FIG. 3. The engine simulation testing apparatus 30 illustrated on FIG. 3 has a mechanism to vertically reciprocate a piston member 32 imitating the upper face of the ring groove and to rotate a piston ring 33. The test was conducted by performing heating control of the piston member 32 with a heater 31, a temperature controller 34, and a thermocouple 35. Testing conditions include a surface pressure of 13 MPa, a ring rotation speed of 3 mm/s, control temperature at 270° C., a test period of 5 hours, and injection of oil in a certain amount along with nitrogen gas at predetermined intervals. After the test, a remaining amount of the coating film of the piston ring and the occurrence of the aluminum cohesion were examined. Results thus obtained are shown in the Tables 1 to 3. Evaluation criteria of the remaining amount of the coating film are as follows:

Excellent: 0.8 µm or more
Good: 0.4 µm or more and less than 0.8 µm
Fair: over 0 µm and less than 0.4 µm
Poor: no coating film remained Also, the aluminum cohesion was evaluated based on visual observation. Results thus obtained are shown in the Tables 1 to 3. Evaluation criteria of the aluminum cohesion are as follows:

Excellent: no aluminum cohesion
Good: very minor aluminum cohesion
Poor: aluminum cohesion occurred The wear amount of the piston member was obtained by measuring the contour of the surface of the piston member after the test and calculating a depth from a reference surface. Results thus obtained are shown in the Tables 1 to 3. Evaluation criteria of the wear amount are as follows:

Excellent: less than 0.5 µm
Good: 0.5 µm or more and less than 1.0 µm
Fair: 1.0 µm or more and less than 3.0 µm
Poor: 3.0 µm or more From the results of the aluminum cohesion resistance performance of the piston ring and the wear amount of the piston member, performance of the piston ring was comprehensively evaluated. Results thus obtained are shown in the Tables 1 to 3. Evaluation criteria of the wear amount are Excellent, Good, Fair, and Poor.

Here, in the comprehensive evaluation, the coating film with no aluminum cohesion and the wear amount of the piston member less than 0.5 µm was evaluated as Excellent, and no remaining coating film with the aluminum cohesion and the wear amount of the piston member 3.0 µm or more was evaluated as Poor. Otherwise, the coating films were evaluated as Good or Fair. The coating films with no item evaluated as Poor were evaluated as Good, and the coating films with one or two items evaluated as Poor were evaluated as Fair.

<Evaluation of Aluminum Cohesion Resistance Performance>

As shown in the Tables 1 to 3, the aluminum cohesion occurred in none of the piston rings of Examples 1 to 34. Although in Examples 17 and 21 the first coating films were so thin and therefore disappeared after the test causing the aluminum cohesion, the aluminum cohesion was very minor and negligible and thus regarded as no problem.

On the other hand, in Comparative Examples 1 and 2 no coating film was remained at all after the test, and the aluminum cohesion occurred. In Comparative Example 3, similarly to the Comparative Examples 1 and 2, no coating film was remained at all after the test, and very minor aluminum cohesion occurred.

Also, in Comparative Example 4 a large amount of coating film was remained with no aluminum cohesion.

Further, in Comparative Example 5 a large amount of coating film was remained with no aluminum cohesion.

<Evaluation of Wear Amount of Piston Member>

As shown in the Tables 1 to 3, the wear amount of the piston member in all Examples except Examples 17, 22, 31, and 34 were as small as less than 0.5 µm. In Examples 31 and 34 where the first coating films have relatively large surface roughness, the wear amount was relatively large. In Examples 17 and 22 where the coating films were relatively thin, the wear amount of the piston member was small but not as small as those of Examples 1 to 16.

In Comparative Examples 1 and 2, on the other hand, the wear amount of the piston member was large, i.e., 3 µm or more.

In Comparative Example 3 the wear amount of the piston member was slightly large, and in Comparative Example 4 the wear amount of the piston member was large.

In Comparative Example 5, further, the wear amount of the piston member was small but not as small as those of Examples 1 to 16.

The Table 2 shows a relation between the thickness of the coating film and the wear amount of the piston member. As can be seen in the Table 2, in Examples 18 to 21 and 23 to 28 where the Vickers hardness HV and the film thickness of the first coating film satisfy the aforementioned formula (B), the wearing of the piston member is suppressed and high aluminum cohesion resistance performance is achieved. Examples 1 to 16 shown in the Table 1 also satisfy the aforementioned formula (B), and the wearing of the piston member is suppressed and high aluminum cohesion resistance performance is achieved.

Further, the Table 3 shows a relation between the surface roughness of the coating film and the wear amount of the piston member. As can be seen in the Table 3, in Examples 29, 30, 32, and 33 where the Vickers hardness HV and the surface roughness of the first coating film satisfy the aforementioned formula (A), the wearing of the piston member is suppressed, and high aluminum cohesion resistance performance is achieved. Examples 1 to 16 shown in the Table 1 also satisfy the aforementioned formula (A), and the wearing of the piston member is suppressed, and high aluminum cohesion resistance performance is achieved.

<Comprehensive Evaluation>

All of the coating films of Examples 1 to 34 were evaluated as "Excellent", "Good", or "Fair". In particular, for all of the coating films having the Vickers hardness HV and the surface roughness of the first coating film that satisfy the aforementioned formula (A), or for all of the coating films having the Vickers hardness HV and the film thickness that satisfy the aforementioned formula (B), all evaluation items were evaluated as "Excellent". That is, it can be seen that piston rings capable of suppressing the wear of the piston member while having high aluminum cohesion resistance performance were obtained.

On the other hand, in Comparative Examples 1 and 2 the resin films exhibited poor aluminum cohesion resistance performance, and the wear amount of the piston member was large.

Also, a nickel coating film in Comparative Example 3 and a DLC coating film in Comparative Example 4 exhibited either good or excellent aluminum cohesion resistance performance, and the wear amount of the piston member was slightly large.

Further, the Comparative Example 5 exhibited high aluminum cohesion resistance performance. The wear amount of the piston member was small but not as small as those of Examples 1 to 16.

Example 2

On the upper side face and the lower side face of the piston ring body made of low chromium steel, coating films made of materials and having the Vickers hardness, the surface roughness, and the thickness as shown in Tables 4 to 6 were formed. Here, films made of $Al_2O_3$, $ZrO_2$, $Y_2O_3$, or $TiO_2$ were formed by a known method of laminating the ceramics fine particles or the vaporized ceramics fine particles directly on the surface, and films made of $Cr_2O_3$, MgO, $3Al_2O_3$-$2SiO_2$, $2MgO$—$SiO_2$, or $Al_2O_3$-40% $TiO_2$ were formed by the spraying. Also, films made of SiC, $Si_3N_4$, $SiO_2$, or AlN were made by the CVD, and films made of TiN, CrN, or CrC, or DLC were made by the PDV. Further, films made of PAI, PBI, PI, or PAR, a resin coating film A, and a resin coating film B were made by the spraying, films made of PEEK, PPS, or PES were made by fluidized bed coating process, and films made of Cu, Ag, Au, Sn, In, or Ni were made by plating. Accordingly, in Example 35, for example, the first coating film made of SiC was formed by the CVD, while the second coating film made of Sn was formed by the plating.

In Table 4, the first coating film of Examples 48 to 50 is made of two types of ceramics. The first coating film of Example 48 was made by mixing $Al_2O_3$ and $SiO_2$ at the ratio of 3:2, and a first coating film of Example 49 was made by mixing MgO and $SiO_2$ at the ratio of 2:1. In Example 50, the first coating film was made by adding 40% by mass of $TiO_2$ to $Al_2O_3$, and the second coating film was made by adding 40% by mass of $TiO_2$ to $Al_2O_3$.

Also, a resin coating film A of Comparative Example 6 is a polyimide resin coating film containing 5% by mass of the $MoS_2$ powder (the mean particle size: 2 μm) and 5% by mass of the graphite powder (the mean particle size: 2 μm).

Also, resin coating films B of Example 58 and Comparative Example 7 are polyimide resin coating films containing 10% by mass of $Al_2O_3$ powder (the mean particle size: 0.5 μm).

Further, the aluminum cohesion resistance film of Comparative Example 10 is made of $Al_2O_3$ and has the single-layer structure.

TABLE 4

| | Coating film | | | | | | | Results of engine simulation test | | | |
| | Material | | Vickers hardness (HV) | | Surface roughness Ra (μm) | | Film thickness (μm) | | Piston ring | | |
| | First coating film | Second coating film | First coating film | Second coating film | First coating film | Second coating film | First coating film | Second coating film | Amount of remaining coating film | Aluminum cohesion resistance performance | Piston member Wear amount | Evaluation |
|---|---|---|---|---|---|---|---|---|---|---|---|---|
| Example 35 | SiC | Sn | 2800 | 55 | 0.05 | | 1 | 1 | Excellent | Excellent | Excellent | Excellent |
| Example 36 | TiN | Sn | 2200 | 55 | 0.05 | | 1 | 1 | Excellent | Excellent | Excellent | Excellent |
| Example 37 | CrN | Sn | 2000 | 55 | 0.05 | | 1 | 1 | Excellent | Excellent | Excellent | Excellent |
| Example 38 | $Al_2O_3$ | Sn | 1700 | 55 | 0.05 | | 1 | 1 | Excellent | Excellent | Excellent | Excellent |
| Example 39 | CrC | Sn | 1600 | 55 | 0.05 | | 1 | 1 | Excellent | Excellent | Excellent | Excellent |
| Example 40 | $Si_3N_4$ | Sn | 1500 | 55 | 0.05 | | 1 | 1 | Excellent | Excellent | Excellent | Excellent |
| Example 41 | $ZrO_2$ | Sn | 1400 | 55 | 0.05 | | 1 | 1 | Excellent | Excellent | Excellent | Excellent |
| Example 42 | $Cr_2O_3$ | Sn | 1300 | 55 | 0.05 | | 1 | 1 | Excellent | Excellent | Excellent | Excellent |
| Example 43 | $SiO_2$ | Sn | 1000 | 55 | 0.05 | | 1 | 1 | Good | Excellent | Excellent | Excellent |
| Example 44 | AlN | Sn | 1000 | 55 | 0.05 | | 1 | 1 | Good | Excellent | Excellent | Excellent |
| Example 45 | $Y_2O_3$ | Sn | 700 | 55 | 0.05 | | 1 | 1 | Good | Excellent | Excellent | Excellent |
| Example 46 | MgO | Sn | 700 | 55 | 0.05 | | 1 | 1 | Good | Excellent | Excellent | Excellent |
| Example 47 | $TiO_2$ | Sn | 500 | 55 | 0.05 | | 1 | 1 | Good | Excellent | Excellent | Excellent |
| Example 48 | $3Al_2O_3$—$2SiO_2$ | Sn | 1200 | 55 | 0.05 | | 1 | 1 | Excellent | Excellent | Excellent | Excellent |
| Example 49 | $2MgO$—$SiO_2$ | Sn | 800 | 55 | 0.05 | | 1 | 1 | Good | Excellent | Excellent | Excellent |
| Example 50 | $Al_2O_3$—40%$TiO_2$ | Sn | 700 | 55 | 0.05 | | 1 | 1 | Good | Excellent | Excellent | Excellent |
| Example 51 | $Al_2O_3$ | PAI | 1700 | 55 | 0.05 | | 1 | 1 | Excellent | Excellent | Excellent | Excellent |
| Example 52 | $Al_2O_3$ | PBI | 1700 | 40 | 0.05 | | 1 | 1 | Excellent | Excellent | Excellent | Excellent |
| Example 53 | $Al_2O_3$ | PI | 1700 | 30 | 0.05 | | 1 | 1 | Excellent | Excellent | Excellent | Excellent |
| Example 54 | $Al_2O_3$ | PEEK | 1700 | 26 | 0.05 | | 1 | 1 | Excellent | Excellent | Excellent | Excellent |
| Example 55 | $Al_2O_3$ | PPS | 1700 | 25 | 0.05 | | 1 | 1 | Excellent | Excellent | Excellent | Excellent |
| Example 56 | $Al_2O_3$ | PAR | 1700 | 25 | 0.05 | | 1 | 1 | Excellent | Excellent | Excellent | Excellent |
| Example 57 | $Al_2O_3$ | PES | 1700 | 20 | 0.05 | | 1 | 1 | Excellent | Excellent | Excellent | Excellent |
| Example 58 | $Al_2O_3$ | Resin coating film B | 1700 | 40 | 0.05 | | 1 | 1 | Excellent | Excellent | Excellent | Excellent |
| Example 59 | $Al_2O_3$ | Cu | 1700 | 300 | 0.05 | | 1 | 1 | Excellent | Excellent | Excellent | Excellent |
| Example 60 | $Al_2O_3$ | Ag | 1700 | 250 | 0.05 | | 1 | 1 | Excellent | Excellent | Excellent | Excellent |
| Example 61 | $Al_2O_3$ | Au | 1700 | 200 | 0.05 | | 1 | 1 | Excellent | Excellent | Excellent | Excellent |
| Example 62 | $Al_2O_3$ | Sn | 1700 | 55 | 0.05 | | 1 | 1 | Excellent | Excellent | Excellent | Excellent |
| Example 63 | $Al_2O_3$ | In | 1700 | 50 | 0.05 | | 1 | 1 | Excellent | Excellent | Excellent | Excellent |
| Comparative Example 6 | Resin coating film A | | 30 | | 0.1 | | 20 | | Poor | Poor | Poor | Poor |
| Comparative Example 7 | Resin coating film B | | 40 | | 0.1 | | 20 | | Poor | Poor | Poor | Poor |
| Comparative Example 8 | Ni | | 300 | | 0.05 | | 20 | | Poor | Good | Fair | Fair |
| Comparative Example 9 | DLC | | 5000 | | 0.01 | | 1 | | Excellent | Excellent | Poor | Fair |
| Comparative Example 10 | $Al_2O_3$ | | 1700 | | 0.05 | | 1 | | Excellent | Excellent | Good | Good |

TABLE 5

| | Coating film | | | | | | | Results of engine simulation test | | | |
|---|---|---|---|---|---|---|---|---|---|---|---|
| | Material | | Vickers hardness (HV) | | Surface roughness Ra (μm) | | Film thickness (μm) | | Piston ring | | |
| | First coating film | Second coating film | First coating film | Second coating film | First coating film | First coating film | Second coating film | Amount of remaining coating film | Aluminum cohesion resistance performance | Piston member Wear amount | Evaluation |
| Example 64 | SiC | Sn | 2800 | 55 | 0.05 | 0.05 | 1 | Poor | Good | Good | Good |
| Example 65 | SiC | Sn | 2800 | 55 | 0.05 | 0.1 | 1 | Fair | Excellent | Excellent | Excellent |
| Example 66 | SiC | Sn | 2800 | 55 | 0.05 | 0.5 | 1 | Good | Excellent | Excellent | Excellent |
| Example 67 | SiC | Sn | 2800 | 55 | 0.05 | 1 | 1 | Excellent | Excellent | Excellent | Excellent |
| Example 68 | SiC | Sn | 2800 | 55 | 0.05 | 3 | 1 | Excellent | Excellent | Excellent | Excellent |
| Example 69 | TiO$_2$ | Sn | 500 | 55 | 0.05 | 0.2 | 1 | Poor | Good | Good | Good |
| Example 70 | TiO$_2$ | Sn | 500 | 55 | 0.05 | 0.5 | 1 | Poor | Good | Good | Good |
| Example 71 | TiO$_2$ | Sn | 500 | 55 | 0.05 | 1 | 1 | Good | Excellent | Excellent | Excellent |
| Example 72 | TiO$_2$ | Sn | 500 | 55 | 0.05 | 5 | 1 | Excellent | Excellent | Excellent | Excellent |
| Example 73 | TiO$_2$ | Sn | 500 | 55 | 0.05 | 10 | 1 | Excellent | Excellent | Excellent | Excellent |
| Example 74 | TiO$_2$ | Sn | 500 | 55 | 0.05 | 1 | 0.5 | Good | Excellent | Good | Good |
| Example 75 | TiO$_2$ | Sn | 500 | 55 | 0.05 | 1 | 2 | Good | Excellent | Excellent | Excellent |

TABLE 6

| | Coating film | | | | | | | Results of engine simulation test | | | |
|---|---|---|---|---|---|---|---|---|---|---|---|
| | Material | | Vickers hardness (HV) | | Surface roughness Ra (μm) | Film thickness (μm) | | Piston ring | | | |
| | First coating film | Second coating film | First coating film | Second coating film | First coating film | First coating film | Second coating film | Amount of remaining coating film | Aluminum cohesion resistance performance | Piston member Wear amount | Evaluation |
| Example 76 | SiC | Sn | 2800 | 55 | 0.01 | 1 | 1 | Excellent | Excellent | Excellent | Excellent |
| Example 77 | SiC | Sn | 2800 | 55 | 0.1 | 1 | 1 | Excellent | Excellent | Excellent | Excellent |
| Example 78 | SiC | Sn | 2800 | 55 | 0.2 | 1 | 1 | Excellent | Excellent | Fair | Fair |
| Example 79 | TiO$_2$ | Sn | 500 | 55 | 0.2 | 1 | 1 | Good | Excellent | Excellent | Excellent |
| Example 80 | TiO$_2$ | Sn | 500 | 55 | 0.3 | 1 | 1 | Good | Excellent | Excellent | Excellent |
| Example 81 | TiO$_2$ | Sn | 500 | 55 | 0.4 | 1 | 1 | Good | Excellent | Fair | Fair |

The aluminum cohesion resistance films of Examples 35 to 81 and Comparative Examples 6 to 10 were evaluated by using the engine simulation testing apparatus illustrated in FIG. 3. The engine simulation testing apparatus 30 illustrated in FIG. 3 has the mechanism to vertically reciprocate the piston member 32 and to rotate the piston ring 33. The test was conducted by performing heating control of the piston member 32 with the heater 31, the temperature controller 34, and the thermocouple 35. Testing conditions include the surface pressure of 13 MPa, the ring rotation speed of 3 mm/s, the control temperature at 270° C., the test period of 5 hours, and the injection of oil in a certain amount along with nitrogen gas at predetermined intervals. After the test, a remaining amount of the coating film of the piston ring and the occurrence of the aluminum cohesion were examined. Results thus obtained are shown in the Tables 4 to 6. Evaluation criteria of the remaining amount of the coating film are as follows:
Excellent: 0.8 μm or more
Good: 0.4 μm or more and less than 0.8 μm
Fair: over 0 μm and less than 0.4 μm
Poor: no coating film remained Also, the aluminum cohesion performance was evaluated based on visual observation. Results thus obtained are shown in the Tables 4 to 6. Evaluation criteria of the aluminum cohesion performance are as follows:
Excellent: no aluminum cohesion
Good: very minor aluminum cohesion
Poor: aluminum cohesion occurred The wear amount of the piston member was obtained by measuring the contour of the surface of the piston member after the test and calculating the depth from the reference surface. Results thus obtained are shown in the Tables 4 to 6. Evaluation criteria of the wear amount are as follows:
Excellent: less than 0.5 μm
Good: 0.5 μm or more and less than 1.0 μm
Fair: 1.0 μm or more and less than 3.0 μm
Poor: 3.0 μm or more From the results of the aluminum cohesion resistance performance of the piston ring and the wear amount of the piston member, performance of the piston ring was comprehensively evaluated. Results thus obtained are shown in the Tables 4 to 6. Evaluation criteria of the wear amount are Excellent, Good, Fair, and Poor.

Here, in the comprehensive evaluation, the coating film without no aluminum cohesion and the wear amount of the piston member less than 0.5 µm was evaluated as Excellent, and no remaining coating film with the aluminum cohesion and the wear amount of the piston member 3.0 µm or more was evaluated as Poor. Otherwise, the coating films were evaluated as Good or Fair. The coating films with no item evaluated as Poor were evaluated as Good, and the coating films with one or two items evaluated as Poor were evaluated as Fair.

<Evaluation of Aluminum Cohesion Resistance Performance>

As shown in the Tables 4 to 6, the aluminum cohesion occurred in none of the piston rings of Examples 35 to 81. Although in Examples 64, 69, and 70 the first coating films were so thin and therefore disappeared after the test causing the aluminum cohesion, the aluminum cohesion was very minor and negligible and thus regarded as no problem.

On the other hand, in Comparative Examples 6 and 7 no coating film was remained at all after the test, and the aluminum cohesion occurred. In Comparative Example 8, similarly to the Comparative Examples 6 and 7, no coating film was remained at all after the test, and very minor aluminum cohesion occurred.

Also, in Comparative Example 9 a large amount of coating film was remained with no aluminum cohesion.

Further, in Comparative Example 10 a large amount of coating film was remained with no aluminum cohesion.

<Evaluation of Wear Amount of Piston Member>

As shown in the Tables 4 to 6, the wear amount of the piston member in all Examples except Examples 64, 69, 70, 74, 78, and 81 was as small as less than 0.5 µm. In Examples 78 and 81 where the first coating films had relatively large surface roughness, the wear amount was relatively large. In Examples 64, 79, and 70 where the first coating films were relatively thin, the wear amount was small but not as small as those of Examples 35 to 63. Further, in Example 74 where the first coating film was relatively thin, the wear amount was relatively large.

In Comparative Examples 6 and 7, on the other hand, the wear amount was large. i.e., 3 µm or more.

In Comparative Example 8 the wear amount was slightly large, and in Comparative Example 9 the wear amount was large.

In Comparative Example 10, further, the wear amount of the piston member was small but not as small as those of Examples 35 to 63.

Table 5 shows the relation between the thickness of the coating film and the wear amount of the piston member. As can be seen in the Table 5, in Examples 65 to 68, 71 to 73, and 75 where the Vickers hardness HV and the film thickness of the first coating film satisfy the aforementioned formula (B), the wearing of the piston member is suppressed and high aluminum cohesion resistance performance is achieved. Examples 35 to 63 shown in Table 4 also satisfy the aforementioned formula (B), and the wearing of the piston member is suppressed and high aluminum cohesion resistance performance is achieved.

Further, Table 6 shows the relation between the surface roughness of the coating film and the wear amount of the piston member. As can be seen in the Table 6, in Examples 76, 77, 79, and 80 where the Vickers hardness HV and the surface roughness of the first coating film satisfy the aforementioned formula (A), the wearing of the piston member is suppressed, and high aluminum cohesion resistance performance is achieved. Examples 35 to 63 shown in Table 4 also satisfy the aforementioned formula (A), and the wearing of the piston member is suppressed, and high aluminum cohesion resistance performance is achieved.

<Comprehensive Evaluation>

All evaluation items of Examples 35 to 83 were evaluated as "Excellent", "Good", or "Fair". In particular, when the Vickers hardness HV and the surface roughness of the aluminum first coating film satisfy the aforementioned formula (A), or when the Vickers hardness HV and the film thickness satisfy the aforementioned formula (B), all evaluation items of Examples 35 to 83 were evaluated as "Excellent". That is, it can be seen that piston rings capable of suppressing the wear of the piston member while achieving high aluminum cohesion resistance performance were obtained.

On the other hand, in Comparative Examples 6 and 7 the resin films exhibited poor aluminum cohesion resistance performance, and the wear amount of the piston member was large.

Also, Comparative Example 8 having a nickel coating film and Comparative Example 9 having a DLC coating film exhibited either good or excellent aluminum cohesion resistance performance, and the wear amount of the piston member was slightly large.

Further, Comparative Example 10 exhibited high aluminum cohesion resistance performance. The wear amount of the piston member was small but not as small as those of Examples 35 to 63.

INDUSTRIAL APPLICABILITY

According to the disclosure herein, the aluminum cohesion resistance film has the two-layer structure constituted by the second coating film with a relatively small Vickers hardness HV that forms the conformable surface and the first coating film with a relatively large Vickers hardness HV that imparts the durability to the aluminum cohesion resistance film. Accordingly, the aluminum cohesion resistance film is capable of preventing the aluminum cohesion for a long time under high temperature and also suppressing the wearing of the piston member, and thus is useful for an automobile parts manufacturing industry.

REFERENCE SIGNS LIST 1, 33 piston ring
11 piston ring body
11a upper side face of piston ring body
11b lower side face of piston ring body
12 aluminum cohesion resistance film
12a first coating film
12b second coating film
20 piston
21 ring groove
22 upper face of ring groove
23 lower face of ring groove
24 cylinder
30 engine simulation testing apparatus
31 heater
32 piston member
34 temperature controller
35 thermocouple

The invention claimed is:

1. A piston ring for an internal combustion engine including a piston ring body having at least one of an upper side face and a lower side face coated with an aluminum cohesion resistance film, wherein the aluminum cohesion resistance film has a first coating film made of only first ceramics material formed on the piston ring body and a second coating film having Vickers hardness HV smaller than that of the first ceramics material formed on the first coating film, and the Vickers hardness HV of the first coating film and an arithmetic mean roughness Ra (μm) of a surface of the first coating film satisfy the following formula (A):

$$Ra < -8.7 \times 10^{-5} HV + 0.39 \quad \text{(A)}.$$

2. The piston ring for the internal combustion engine according to claim 1, wherein the second coating film is made of second ceramics material, and the Vickers hardness HV of the first coating film and that of the second coating film are 1000 to 2800 and 500 to 800, respectively.

3. The piston ring for the internal combustion engine according to claim 1, wherein the second coating film is made of resin or metal, and the Vickers hardness HV of the first coating film and that of the second coating film are 500 to 2800 and 20 to 300, respectively.

4. The piston ring for the internal combustion engine according to claim 1, wherein the Vickers hardness HV of the first coating film and a thickness h (μm) of the first coating film satisfy the following formula (B):

$$h > -2.9 \times 10^{-4} HV + 0.89 \quad \text{(B)}.$$

5. The piston ring for the internal combustion engine according to claim 1, wherein the arithmetic mean roughness of the surface of the first coating film is 0.3 μm or less.

6. The piston ring for the internal combustion engine according to claim 1, wherein the thickness of the first coating film is 0.1 μm or more, a thickness of the second coating film is 1 μm or more, and a total thickness of the first coating film and the second coating film is 20 μm or less.

7. The piston ring for the internal combustion engine according to claim 2, wherein the first ceramics is at least one selected from a group consisting of alumina, zirconia, chromia, silica, silicon carbide, chromium carbide, titanium nitride, chromium nitride, silicon nitride, and aluminum nitride, and the second ceramics is at least one selected from a group consisting of titania, yttria, and magnesia.

8. The piston ring for the internal combustion engine according to claim 3, wherein the first ceramics material is at least one of alumina, titania, yttria, zirconia, silica, magnesia, chromia, silicon carbide, chromium carbide, aluminum nitride, titanium nitride, silicon nitride, and chromium nitride; material of the resin is at least one of polyimide, polyetherimide, polyamideimide, polysulfone, polyether sulfone, polyarylate, polyphenylene sulfide, polyether ether ketone, aromatic polyester, aromatic polyamide, polybenzimidazole, polybenzoxazole, aromatic polycyanurate, aromatic polythiocyanurate, and aromatic polyguanamin; and material of the metal is at least one of indium, lead, tin, copper, silver, and gold.

* * * * *